Figure 1:
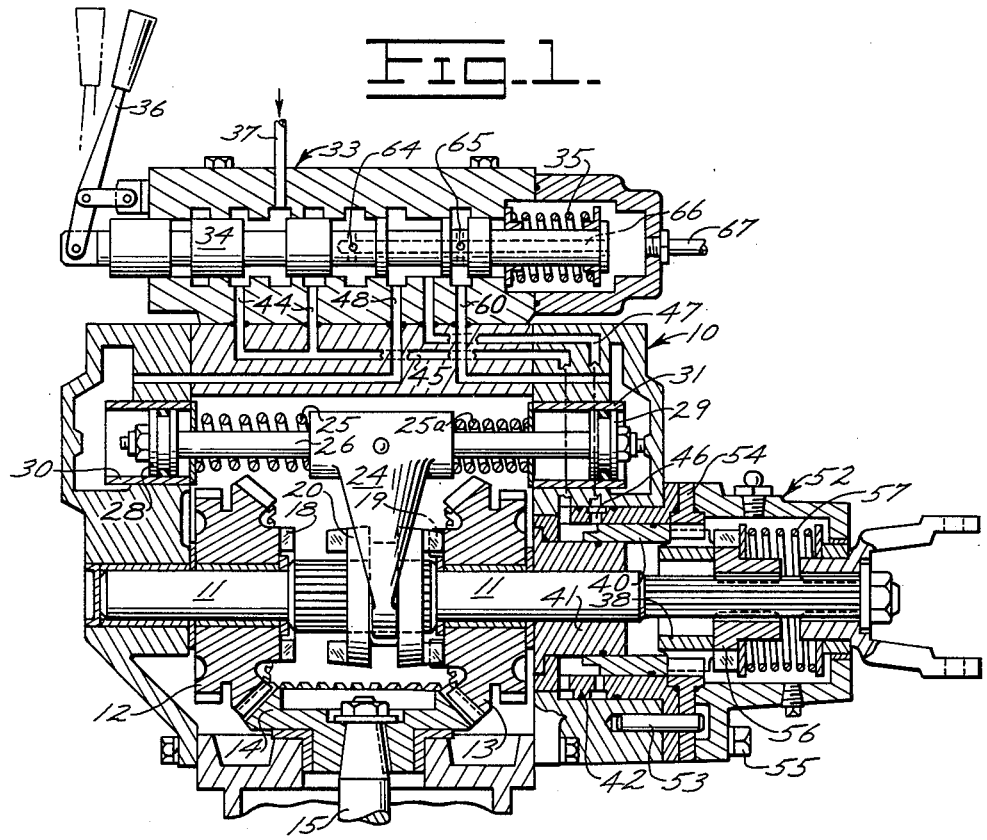

Jan. 12, 1965   A. V. HAMPTON ETAL   3,165,181
LOCK FOR HYDRAULICALLY CONTROLLED TRANSMISSION
Filed Feb. 11, 1963

INVENTORS
ANDREW V. HAMPTON
CARLISLE S. MORRIS
BY
*Frazier and Zimmerlal*
ATTORNEYS

United States Patent Office 3,165,181
Patented Jan. 12, 1965

3,165,181
LOCK FOR HYDRAULICALLY CONTROLLED TRANSMISSION
Andrew V. Hampton and Carlisle S. Morris, Decatur, Ill., assignors to Caterpillar Tractor Co., Peoria, Ill., a corporation of California
Filed Feb. 11, 1963, Ser. No. 257,548
4 Claims. (Cl. 192—4)

This invention relates to transmissions of the forward-reverse type employed for adjusting movable machine components and particularly to means operable automatically to lock the driven shaft of a transmission against rotation except when adjustment is being made.

In some earthmoving machines, controls are powered from a power takeoff shaft of an engine which serves to drive the machine. For example in motor graders, the raising, lowering, revolving and tilting of the cutting blade as well as other adjustments such as the leaning of the front wheels are made through rotatable shafts adapted to be connected with a power shaft driven by the engine through positive drive dog clutches. Engagement and disengagement of these clutches is accomplished manually through appropriate shifting levers and in some cases, hydraulic means are employed as boosters between the manual lever and the transmission.

Locking couplings sometimes referred to as anti-creep brakes of various types have been employed to prevent forces encountered by the adjusted component from being exerted back through the transmission with the result that the adjusted position of the component is lost and in some cases, the transmission is damaged. Such locks or brakes are normally engaged and automatically disengaged upon shifting of the transmission into either its forward or reverse drive position.

It is the object of the present invention to provide an improved locking coupling or anti-creep brake capable of withstanding very heavy loads and operable automatically by the same hydraulic pressure that is used for shifting the transmission.

Further and more specific objects and advantages of the invention are made apparent in the following specification wherein reference is made to the accompanying drawing.

Figure 2:
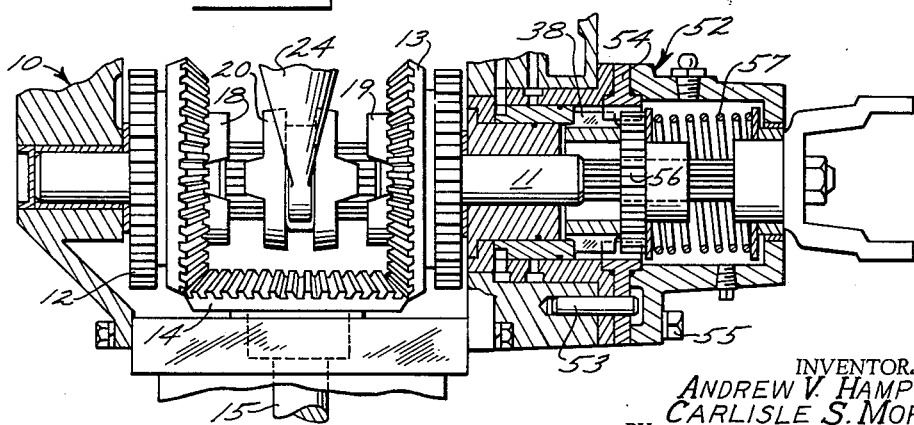

In the drawing:

FIG. 1 is a central vertical sectional view through a transmission and control valve therefor showing the locking coupling of the present invention associated therewith; and FIG. 2 is a fragmentary view showing the locking coupling in a different position of adjustment.

The transmission disclosed in the drawing is of a known type described in application for United States Letters Patent of Paul B. Benner et al., Serial No. 75,748, for "Hydraulic Control System With Pressure Control Valve," now Patent No. 3,088,488. The transmission is contained in a housing, generally indicated at 10, within which is mounted a driven shaft 11 extending outwardly through one side of the housing where, in practice, it is connected with some part to be controlled. Such part, for example, may be a motor grader scraper blade or other control member on a road grading machine. Mechanism, not shown, is employed for raising or otherwise adjusting the blade upon rotation of the shaft 11 in one direction and reversing the adjusting operation upon rotation of the shaft in the opposite direction. Rotary movement is imparted to the output shaft 11 through either one of a pair of bevel gears 12 and 13 freely rotatable on the shaft and constantly driven in opposite directions by a meshing bevel gear 14. The gear 14 is carried on a shaft 15 connected through mechanism, not shown, with a suitable power takeoff shaft of the main engine of the road grading machine.

The bevel gears 12 and 13 being thus driven in opposite directions, connection of either one or the other with the driven shaft 11 is effective to impart rotary motion thereto selectively in opposite directions. Each of the gears 12 and 13 is provided with a toothed clutch face as indicated at 18 and 19, respectively, and a clutch shifting collar 20 is provided with toothed clutch faces for engagement with the clutch faces 18 and 19 of the gears 12 and 13. A shifting fork 24 is secured to a slidable shifting rod 26 which slides axially to effect selective engagement of the clutches described for imparting either forward or reverse rotation to the shaft 11. Springs 25 and 25a normally hold the shifting rod and fork in a central position as shown in FIG. 2 where both clutches are disengaged.

Axial movement is imparted to the shifting rod 26 by hydraulic pressure in a servo or fluid motor which comprises a pair of pistons 28 and 29 suitably fixed to opposite ends of the rod 26 and slidably disposed in cylinders 30 and 31, respectively, herein illustrated as sleeves inserted in bores in the housing 10.

A control valve 33 is employed for selectively directing fluid under pressure to the pistons 28 and 29 of the fluid motor and comprises a body with a suitable bore for the reception of a spool 34 normally held in a central position by a well known type of centering spring 35. The spool is adapted to be moved in either direction by a control lever 36 and fluid from a suitable source under pressure entering the valve through a line 37 is directed to the piston 28 or 29 depending upon the direction of movement of the lever.

Locking mechanism of the present invention is contained in a housing, generally indicated at 52, and is illustrated in its locked position in FIG. 2 where the transmission clutches are shown in their neutral positions. The lock comprises an internally toothed ring 54 held in position by two parts of the housing 52 secured together as by cap screws shown at 55. A locating pin 53 insures exact indexing of the ring. An externally toothed or gear-like member 56 is splined to and slidable on the shaft 11 in a position to mesh with the stationary member 54 and prevent rotation of the shaft. A spring 57 disposed between the interior of the housing and the toothed member 56 normally urges it into locking position as shown in FIG. 2. A non-rotatable externally toothed member 38 also meshes with the stationary member 54 and is axially slidable with respect thereto so that upon movement to the right, as viewed in the drawing, the member 38 will engage the member 56 and move it rightward against the force of spring 57 to the position shown in FIG. 1 where it is out of mesh with the stationary member 54 to permit rotation of the shaft 11. This rightward or unlocking movement of the member 38 is accomplished by a servo or an annular piston 40 in an annular cylinder space between a bushing 41 which embraces the shaft 11 and a tubular portion 42 of the housing 52. It is apparent from the relationship of the parts shown that pressure behind the piston 40 will move it toward the right to disengage the locking mechanism in the manner described.

Pressure is directed to the piston 40 by manipulation of the control valve 33 in either direction and the piston is actuated to unlock the locking coupling just prior to engagement of the clutches 18 or 19 for driving the shaft 11. The fluid passages between the valve 33 and transmission parts are shown schematically for the purpose of simplification since in actuality they are not in a single plane.

In FIG. 1, the control lever is shown as adjusted toward the right from its neutral position illustrated in broken lines to effect engagement of the clutch 19 for driving the shaft 11 in one direction. The spool 34 has been moved to the left to open one of a pair of passages 44 communicating with a common passage 45 which directs fluid under pressure to the cylinder behind the servo piston 40. As the piston 40 moves to the right as shown in FIG. 1 to unlock the coupling, it uncovers a port 46 communicating with a passage 47 leading back to the spool chamber of the valve 33. In this adjusted position of the valve, the return passage 47 is in communication with a passage 48 leading, as shown, to the servo piston 28 to effect engagement of the clutch 19 in a manner previously described. Movement of the lever 36 toward the left from its neutral position will unlock the locking coupling and effect engagement of the clutch 18 for driving the shaft 11 in the opposite direction. This movement of the lever 36 would effect rightward movement of the spool 34 opening the right hand passage 44 to communicate pressure to actuate the piston 40 and pressure in the return line 47 would be communicated through the valve 33 to the passage 60 and thence to the piston 29 to effect engagement of the clutch 18. When the control valve is moved to its neutral position after the machine component operated by the shaft 11 has been suitably positioned, the spring 57 returns the locking coupling to its locked condition. The springs 25 and 25a center the shifting fork 24 and fluid behind the actuated piston 28 or 29 is relieved through ports 64 or 65 which communicate with an axial passage 66 in the spool to direct fluid to a line 67 communicating with a sump, not shown.

We claim:

1. For combination with a machine having an adjustable component and power actuated means including a rotatable shaft and a forward-reverse transmission for adjusting said component, locking means normally holding said shaft against rotation, fluid actuated servo means for engaging said transmission, fluid actuated servo means for releasing the locking means, a source of fluid under pressure, means to direct fluid first to the lock releasing servo and then automatically to the transmission engaging servo, said locking means comprising a fixed toothed member, a second toothed member rotatable with and slidable on said shaft to mesh with the fixed member, and means connecting the lock releasing servo to said second toothed member.

2. For combination with a machine having an adjustable component and power actuated means including a rotatable shaft and a forward-reverse transmission for adjusting said component, locking means normally holding said shaft against rotation, fluid actuated servo means for engaging said transmission, fluid actuated servo means for releasing the locking means, a source of fluid under pressure, means to direct fluid first to the lock releasing servo and then automatically to the transmission engaging servo, said lock releasing servo including a piston in a cylinder having a port for the introduction of fluid under pressure to move the piston for releasing the lock, said cylinder having a second port positioned to be opened upon such movement of the piston and means to direct fluid from said second port to the transmission engaging servo.

3. In combination with a shaft and a housing surrounding the shaft, locking means for holding the shaft against rotation with respect to the housing comprising, an annular internally toothed element fixed to the housing and surounding the shaft, an externally toothed member slidably and non-rotatably carried by the shaft, resilient means to urge said member into meshing engagement with said element from one side thereof, a second externally toothed member meshing with said element from the opposite side thereof, and means to move said second member axially to urge the first member away from the internally toothed element.

4. In combination with a shaft and a housing surrounding the shaft, locking means for holding the shaft against rotation with respect to the housing comprising, an annular internally toothed element fixed to the housing and surrounding the shaft, an externally toothed member slidably and non-rotatably carried by the shaft, resilient means to urge said member into meshing engagement with said element from one side thereof, a second externally toothed member meshing with said element from the opposite side thereof, and fluid pressure actuated means to move said second member axially to urge the first member away from the internally toothed element.

References Cited in the file of this patent

UNITED STATES PATENTS

| | | |
|---|---|---|
| 1,414,000 | Todd | Apr. 25, 1922 |
| 1,476,989 | Massey | Dec. 11, 1923 |
| 2,023,597 | Klocke et al. | Dec. 10, 1935 |
| 2,783,661 | Dryer | Mar. 5, 1957 |
| 2,967,596 | Page | Jan. 10, 1961 |